UNITED STATES PATENT OFFICE.

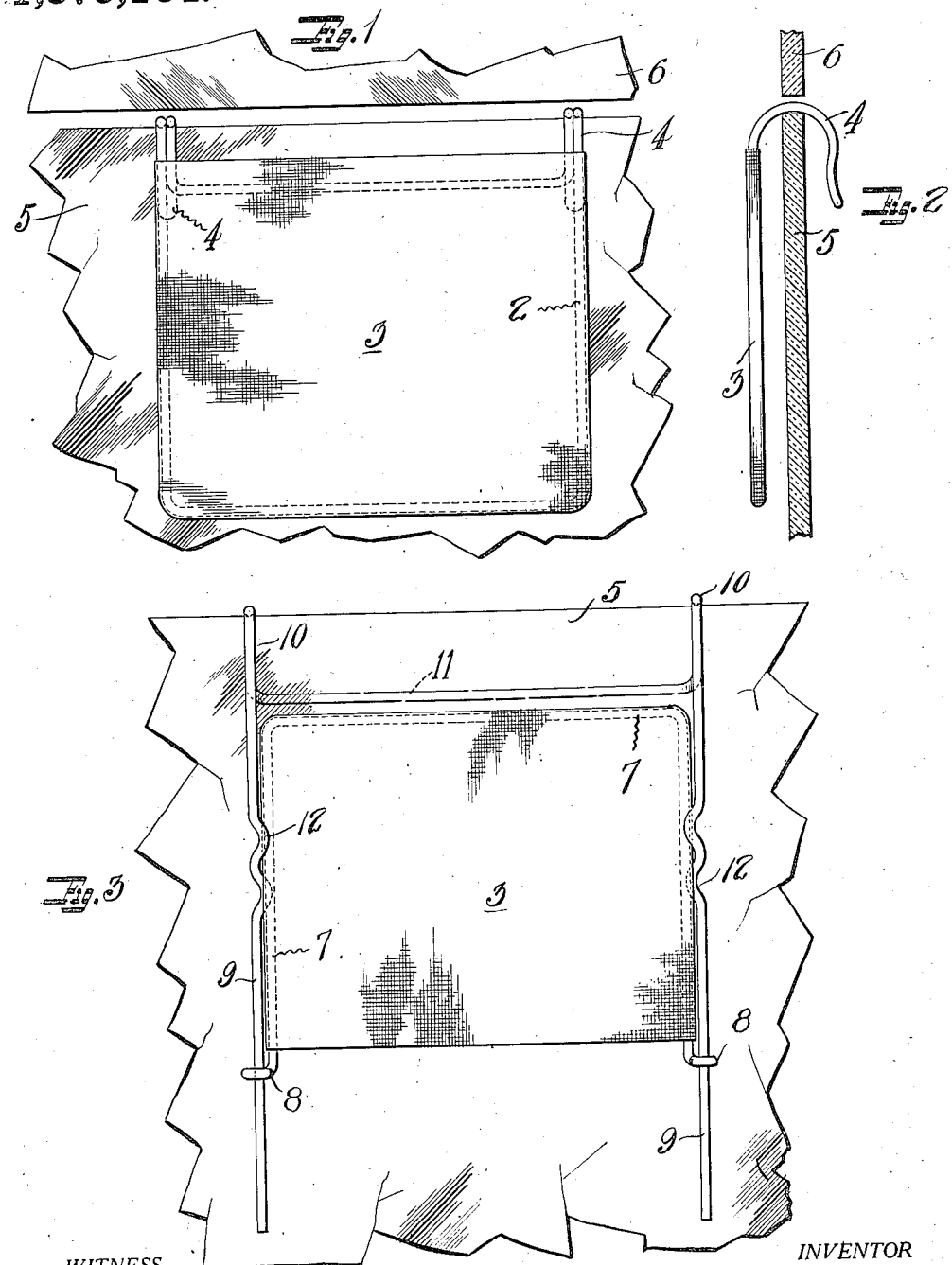

WATSON H. MALOTT, OF SAN FRANCISCO, CALIFORNIA.

WINDSHIELD-SHADE.

1,375,164.  Specification of Letters Patent.  Patented Apr. 19, 1921.

Application filed December 9, 1918. Serial No. 265,820.

*To all whom it may concern:*

Be it known that I, WATSON H. MALOTT, a citizen of the United States, and a resident of the city and county of San Francisco and State of California, have invented a new and useful Windshield-Shade, of which the following is a specification.

My invention relates to shades for windshields of automobiles, and an object of the invention is to provide means for obscuring or lessening the glare of the headlights of an approaching machine.

Another object of the invention is to provide a shade which is readily adjusted to different locations on the glass of the windshield.

The invention possesses other features of advantage, some of which, with the foregoing, will be set forth in the following description of the preferred form of my invention which is illustrated in the drawings accompanying and forming part of the specification. It is understood that I do not limit myself to the showing made by the said drawings and description, as I may adopt variations of the preferred form within the scope of my invention as set forth in the claims.

Referring to the drawings—

Figure 1 is a front elevation of the shade of my invention as it appears from the driver's seat of the automobile. The glass of the windshield is shown in broken lines.

Fig. 2 is a side view of the shade, the windshield being shown in section.

Fig. 3 is a modified form of my shade.

Drivers of automobiles are bothered by the glare of the lights on an approaching vehicle and my invention comprises a shade, which is conveniently attached to the windshield for intercepting the light rays before they reach the eyes of the driver. A flat rectangular frame 2 of any desired size, say about 4 x 5 inches and conveniently formed of wire is covered with a fabric 3 which is conveniently formed as an envelop so that it may be readily slipped over the frame. The fabric may be heavy to provide an opaque shade, but preferably is made of light translucent material such as silk or clouded celluloid which does not wholly blot out the rays from the approaching headlight, although destroying all glare therefrom.

At the top corners of the frame the wire is bent to form hooks 4 adapted to engage the top edge of the lower part 5 of the shield 5—6.

The shade is used by hooking it over the edge of the shield and moving it sidewise as required to intercept the glare from lights ahead. Although small in area, it is so close to the eyes of the driver that it may be moved to cover the area in the shield intersected by those light rays which would otherwise reach the eyes, leaving vision of the roadway substantially unobstructed. When made of translucent material it does not wholly blot out the rays but leaves their source still faintly visible, so that the exact location of the other vehicle is not lost to the driver.

In Fig. 3 I have shown a modified form of the device which permits of vertical adjustment of the shade. The opaque or translucent coverings 3 is held by the three-sided frame 7. The ends of the vertical members of the frame 7 are provided with loops 8 adapted to surround the vertical members 9 of a main supporting frame which is supported from the top edge of the lower half of the wind shield by hooks 10 which may be formed the same as hooks 4 of Fig. 1 construction, or which may be formed as a single curve in the wire, the ends of the curves being connected by the portion 11 which will lie on the opposite side of the shield 5.

In order to position the shade frame 7 in the main supporting frame and prevent lateral disengagement of the frames, the vertical members 9 are each provided with inwardly extending waves or bends 12 lying in planes about 60° apart, so as to lie, one in front of and one behind the adjacent vertical member of the shade frame. The shade frame is engaged with sufficient pressure due to the resilience of the supporting frame to retain it in desired adjusted position.

I claim:

1. A shade for automobile windshields comprising a frame, means for supporting the frame on the windshield, a second frame slidable on said first frame and resiliently held therein and a fabric envelop adapted to be drawn over said second frame.

2. A device for automobile windshields comprising a flat frame having resilient vertical members, means for supporting the frame on the windshield, a second flat frame provided with loops adapted to surround the vertical members of the first frame, the vertical members of said first frame being formed with waves between which the sides of the second frame are adapted to lie, and a translucent shade arranged on said second frame.

In testimony whereof, I have hereunto set my hand at San Francisco, California, this 25th day of November, 1918.

WATSON H. MALOTT.